Sept. 26, 1972      J. A. CASEY      3,694,262
METHOD AND COMPOSITION FOR SANITATION OF SUGAR FACTORIES
Filed July 31, 1969
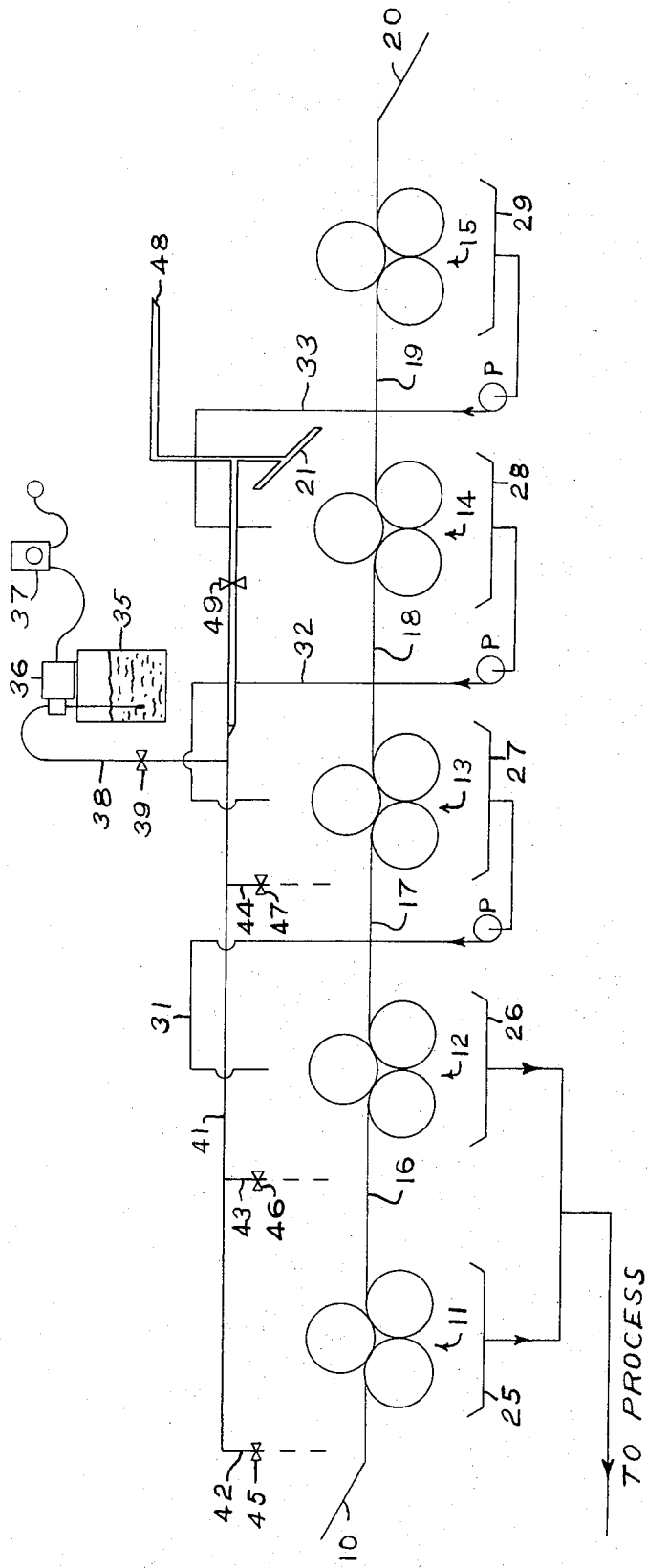
INVENTOR.
JOHN A. CASEY
BY
BOSWORTH, SESSIONS
HERRSTROM & CAIN
ATTORNEYS United States Patent Office 3,694,262
Patented Sept. 26, 1972

1

3,694,262
METHOD AND COMPOSITION FOR SANITATION OF SUGAR FACTORIES
John A. Casey, 2804 Brainard Road, Pepper Pike, Ohio 44124
Filed July 31, 1969, Ser. No. 846,498
Int. Cl. A23l 3/34; C13d 1/02
U.S. Cl. 127—44    7 Claims

ABSTRACT OF THE DISCLOSURE

A method of reducing the loss of sugar in sugar factories due to inversion or other degradation of the raw sugar juices caused by bacteria, enzymes and the like which involves the periodic application of shock doses of a bactericidal material to the incoming sugar cane at the entry end of the extraction equipment. This is accomplished in sugar cane mills by applying a solution of a dual quaternary ammonium composition comprising n-alkyl dimethyl benzyl ammonium chloride and n-alkyl dimethyl ethylbenzyl ammonium chloride, to the crusher and the first one, two or three mills, for example, for periods of five minutes during each half hour of operation.

BACKGROUND OF THE INVENTION

This invention relates to the sanitation of sugar factories and more particularly to the reduction of the degradation and loss of sucrose in sugar juices in the sugar factory resulting from bio-chemical reactions. It has been known that in the production of sugar from sugar cane and sugar beets there has been a major loss of sugar due to inversion of the sucrose in the raw sugar juices and other types of degradation of the juices caused by bacterial action, enzymes, and perhaps other biological factors. These losses may run from about 0.5% up to as much as 4 to 5% of the total sugar entering the factory. Not only is there a loss of a substantial amount of sugar, but also the bacterial action is accompanied by obvious accumulations of bacterial and enzyme growth near the milling stations and foul odors in the factory. Heretofore, this problem has been attacked primarily by the conventional housekeeping practices of employing hot water and steam-wash-downs in the areas that are visibly affected. Also, chlorine and other sanitizing chemicals have been employed. These practices have not been successful and have largely been carried out on the basis of attacking obvious evidences of the problem, such as the growths around the milling stations, rather than getting at the root of the problem, which is the biological degradation of the sugar juices. Furthermore, the usual housekeeping practices have been expensive, due to the amount of manual labor required, and have not been satisfactory. Sanitizing chemicals such as chlorine are restricted in their use due to the intensive spray applications required and the corrosiveness of the materials. Other biocides have been proposed but they have been added principally towards the end of the extraction operation. Furthermore, the chemicals that have been employed have required large doses for reasonable control and have frequently been major sources of skin irritation. Also, there are no satisfactory procedures for sanitizing the interior surfaces of the extensive plumbing equipment of sugar factories.

SUMMARY

A general object of the present invention therefore is the provision of a method and composition whereby the defects of prior sanitizing methods employed in connection with the sugar juice in sugar factories are largely eliminated. Another object is the provision of a method

2 and composition for sanitation in sugar factories whereby the inversion or other degradation of the sucrose in the sugar juice by biological agents is substantially reduced, whereby the yield of sugar for a given tonnage of cane or beets entering the factory is substantially increased. Another object is the provision of a method that can be carried out automatically with simple equipment at reasonable cost. Another object is the provision of a sanitizing method for sugar factories that employs a composition that can be applied both to the cane entering the mill and as a sanitizing agent to the areas of the factory adjacent the mill. Another object is the provision of a sanitizing method for sugar factories and particularly for the juice extracting equipment that employs a non-corrosive composition that is substantially eliminated during the process of extracting the sugar from the juices.

Briefly, the invention contemplates the application of an aqueous solution of a biocidal composition, preferably a quaternary ammonium composition, to the cane as it enters and passes through the first portion of the extraction equipment in fairly concentrated solutions for short periods of time, for example from about two minutes to about five minutes, at intervals of from 30 minutes to two hours. The invention also contemplates the spraying of more concentrated solutions of the same biocide at less frequent intervals on areas of the factory adjacent the cane extraction equipment where the juice splashes. By this method and with the preferred composition, as appears more fully below, the sanitary conditions of the mill are greatly improved at low cost, improving the working condition in the entire factory. Also the inversion or other degradation of the sugar in the juices is substantially reduced so that an improved yield of sugar is obtained per ton of cane that is milled, the improved yield giving a financial return that greatly exceeds the cost of the sanitizing operation, so that the profit of the mill per ton of cane milled is increased.

BRIEF DESCRIPTION OF THE DRAWINGS

The single figure of the drawing is a diagrammatic elevation of a conventional mill for extracting the juice from sugar cane and illustrating the sanitation of the mill in accordance with the present invention.

DESCRIPTION OF THE PREFERRED EMBODIMENT

The process and composition of the present invention are adapted for use with conventional juice extracting equipment whether for sugar cane or in the diffusion process employed in extracting juice from sugar beets, and in some cane factories, without substantial modification in either the structure or operation of the equipments themselves. The drawing diagrammatically illustrates a conventional type of mill for the extraction of juice from cane, but it is to be understood that the invention may be applied to diffusion-type extraction equipment. In the apparatus shown in the drawing the sugar cane, after passing through the conventional cane cleaning equipment, is fed by an appropriate conveyor 10 at the left hand end of the apparatus shown in the drawing to a conventional crusher 11 made up of three rolls. The cane then travels to four substantially identical mills indicate at 12, 13, 14 and 15, each comprising a set of three rolls. The cane is conveyed by suitable conveyors 16, 17, 18 and 19 between the crusher and the first mill and between the succeeding mills. The bagasse is discharged over a conveyor 20. Fresh water is sprayed on the cane in conventional manner by a sprayer 21 as the cane leaves the third mill (mill 14) and fresh water imbibition may also be employed after the earlier mills, if desired.

The juice extracted from the cane is collected in pans 25, 26, 27, 28 and 29 beneath the crusher 11 and the mills 12, 13, 14 and 15, respectively. The juice from the pans 25 and 26 continues on through the sugar factory and the usual processing and crystallization operation. The juice from the pan 27 is recirculated to the cane entering the first mill 12 through piping 31, the juice from the pan 28 is recirculated to the cane entering the second mill 13 through the piping 32, and the juice from the final mill 15 is recirculated to the cane entering the third mill 14 through piping 33. This is all in accordance with conventional practice; practices may vary in different factories but the general underlying principles are the same.

According to a preferred form of the present invention, sanitation of the sugar mill and reduction in the loss of sugar from the juices is accomplished preferably by the simple apparatus shown in the drawing and comprising a tank 35 serving as a reservoir for the sanitizing chemical, an electrically driven circulating pump 36 and a timer 37 that controls the flow of current to the pump to operate the pump for desired periods of time, for example 2 to 5 minutes, at desired intervals, for example once every one-half to 2 hours. The discharge from the pump leads to a pipe 38 having a valve 39, the pipe 38 being connected to a longitudinal extending pipe 41. The sanitizing chemical is discharged on the cane immediately preceding the crusher and mill rolls through downwardly extending pipes 42, 43 and 44 which are controlled by valves 45, 46 and 47, respectively. These valves control the rate of flow of the material through the downwardly directed discharge pipes. The pipes 42, 43 and 44 are disposed to discharge the chemical immediately preceding the crusher 11, the first mill 12 and the second mill 13, respectively. It is important to discharge the chemical on the cane in the early stages of the mill. Ordinarily, discharge of the chemical onto the cane in advance of the crusher and the first two mills is preferred, but if desired the chemical can be discharged on the first three mills, particularly if more than four mills are employed. In general, however, the chemical should not be supplied to more than the three-fifths of the extraction equipment. While transverse distributing pipes may be employed of each of the pipes 42, 43 and 44, this has been found to be unnecessary, the sanitizing chemical being distributed transversely of the apparatus sufficiently by the action of the rolls themselves during the milling operation. The sanitizing solution is discharged in pencil sized streams from the downwardly extending pipes, the rate of flow being adjusted to provide the required amount of chemical per ton of cane being milled by means of correlated adjustments of the timer and the valves 45, 46 and 47.

A fresh water pipe 48 controlled by a valve 49 may be connected to pipe 41 so that the flow of fresh water can be employed to wash out the pipe 41 and the associated vertical pipes 42, 43 and 44. Also the flow of fresh water can be used in adjusting the valves 45, 46 and 47 to give approximately the desired rate of flow.

It is to be noted that the sanitizing chemical is applied to the cane before it enters the mill and in the early stages of the juice extraction operation. This is contrary to the usual practice in which sanitizing chemicals have been applied to the later stages of the mill or added to the juice. As explained below, the addition of the sanitizing chemical and particularly the sanitizing chemical disclosed herein in the early stages of the extraction process has important advantages.

It will be appreciated that biocidal compounds having sufficient bactericidal action to be effective in sanitizing sugar juices ordinarily are also toxic to humans and hence unsuitable for use in sugar factories unless used in dilute solutions or in such manner that the amount of the biocide remaining in the crystallized sugar and in the molasses is so small as to be within the permissible levels in accordance with the regulations of the Food and Drug Administration. This requirement has heretofore seriously limited sanitation of sugar factories and particularly sanitation aimed at preventing the biological degradation of sugar juice. According to the present invention, however, the biological degradation of sugar juice is greatly reduced and the yield of sugar per ton of canes substantially increased by periodic doses of fairly concentrated solutions of a bactericidal material through apparatus of the sort indicated in the drawing, the bactericidal material being a cationic surface active quaternary ammonium composition that is highly effective against the biological agents ordinarily found in sugar cane and sugar juices and, because of its cationic surface active nature is effectively adsorbed by the cane and bagasse and also by solids that are removed from the sugar juice in the clarifiers, with the result that the greatest amount of the composition found in the clarified juice has been 0.1 p.p.m., in a single test, while all other tests have revealed no trace of the compound in the sugar juice leaving the clarifiers.

The preferred quaternary ammonium composition is n-alkyl dimethyl benzyl ammonium chloride, 25%, 25% n-alkyl dimethyl ethylbenzyl ammonium chloride, inert ingredients 50%, supplied under the trade name, BTC 2125 (50%) from Onyx Chemical Company. This material has the general formula

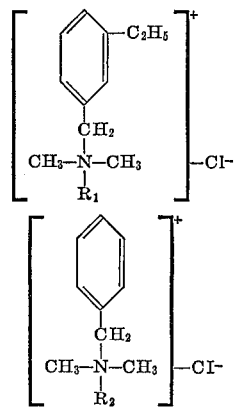

The prefered chemical, BTC 2125 (50%), is a clear slightly syrupy liquid and the average dosage for application to the mill is 10 pounds of the chemical (containing 50% of the quaternary ammonium composition) per 1,000 tons of cane. This gives an average of about 5 parts of the 100% active quaternary ammonium composition per million parts of juice under average conditions. To apply, 10 pounds of the chemical are dissolved in 40 gallons of water and the solution is applied to 1,000 tons of cane. For example, if the mill has a capacity of 6,000 tons per cane per day, or 250 tons per hour, the 50% quaternary ammonium composition would be fed to the mill at the rate of 2½ pounds per hour. However, the composition is not fed continuously but, as noted above, is fed in shock doses of, for example, 5 minutes duration twice each hour. In the example given, on the average about 10 gallons of the water solution would be fed to the mill each hour, approximately equally divided among the discharge pipes 42, 43 and 44, but the feeding would be accomplished by supplying about 5 gallons of the solution to the mill during one five minute period and then after the lapse of twenty five minutes supplying another five gallons of the solution to the mill during a period of five minutes and so on. By this shock addition method the effectiveness of the dosage is greatly increased. The bacterial population is greatly decreased by the addition of relatively concentrated amounts of the composition and the development of resistant strains of bacteria is prevented.

The ability of the composition to be adsorbed by the cane as well as by the mill and the equipment with which the cane and juice come into contact is also an important reason for its effectiveness. As shown in the drawing, the chemical is added to the incoming cane before it reaches the crusher rolls 11. However, even though the juice from the crusher rolls 11 is collected in the pan 25 and goes directly to further processing, it appears probable that a major portion of the chemical is adsorbed by the cane and by the structure of the mill while the portion of the chemical that is discharged with the juice into pan 25 is largely adsorbed by solids suspended in the juice, where it also retains its bactericidal activity. It remains active on the surface of the cane as a biocide during the passage of the cane through the mill. This activity is reinforced by the additional dosage given before the first and second mills 12 and 13. Thus the chemical travels through the mills with the cane and a major portion of the chemical is discharged on the surface of the bagasse. The chemical is also adsorbed by the rolls, conveyors and other equipment and its biocidal activity continues until it is used up by the bacteria that are destroyed. Therefore, the periodic shock treatment serves to maintain the mill in a continuously sanitary condition.

While the addition of the chemical to the mill as described above is important in improving the sanitary conditions of the mill as well as in reducing degradation of sugar, it is also desirable to spray a solution of approximately four ounces of the chemical to five gallons of water in those areas around the mill where juice splashes. This is preferably carried out following the routine hot water or steam wash downs that are ordinarily employed in sugar factories by a spray application of the chemical in the above solution. This can be carried out by a conventional knap-sack type of sprayer employed for manual application in the areas surrounding the mill. This is ordinarily done every eight hours in sugar factories, but the frequency of spray can vary from once every four hours to once every 24 hours, depending upon the local conditions. By the combination of the application of the material to the mill as described above with local spraying of the areas surrounding the mill, the sanitary conditions surrounding the mill are greatly improved, slime and other biological growths are substantially eliminated and the foul odors often found in sugar factories are also reduced or eliminated with resulting great improvement in the working conditions in the factories. The composition remains active on the surfaces surrounding the mill for several hours after application.

While the preferred rate of application in 10 pounds of the 50% solution per 1000 tons of cane fed to the mill with application doses of a duration of 5 minutes during each half hour of operation, these amounts and frequencies of operation can be varied substantially deending upon the nature of the cane supplied to the mill, the general sanitary conditions in the factory and other similar factors. For example, poor conditions will require more of the solution to be added while good conditions, simple and effective plumbing and good juice drainage may require less of the solution. Thus the duration of the application can be varied between a minimum of one minute to a maximum of about 10 minutes, from 2 to 5 minutes being the preferred duration. Two applications per hour are preferred, but in many mills one application every hour or two is sufficient. The interval between shock treatments, however, should not exceed two hours for best results.

During the shock treatments, the rate of application should be about 5 parts per million of the 50% solution to the raw sugar juice weight but this rate of application can be varied from one part per million to 20 parts per million on the juice weight (that is 0.5 part per million to 10 parts per million of the 100% active quaternary ammonium composition based on the weight of the raw sugar juice).

Carefully conducted tests in sugar factories have shown important reductions in the drop between the apparent purity of the juice expressed from the crusher and the apparent purity of the overall mixed juice that is collected from each of the several mills that are employed to complete the extraction of the juice from the cane. Theoretically the basic minimum difference between crusher juice purity and mixed juice purity is of the order of 1 to 1.3%. Losses in purity of greater than about 1.3% result from increasing loss of sucrose due to bacterial inversion and perhaps other types of degradation. In one series of tests employing a shock dosage treatment to the first sections of a mill as outlined above, during one week of operation in the factory without any treatment but with ordinary housekeeping, the apparent purity drop was 3.23%. The following week using the composition and method of the present invention the apparent purity drop was reduced to 2.23%. During the second and third weeks immediately following the original test, the apparent purity drop was reduced to 1.40%, the sour smells in the mills had been eliminated and slime growth had been controlled. It is to be noted that the improvement increased with continued usage of the invention, probably due to the continued biocidal activity of the adsorbed chemical in the crusher and mill.

Tests in other mills have shown comparable improvement. The importance of a reduction in apparent purity loss in the mixed juice becomes evident when it is considered that it is ordinarily recognized that a 0.5% reduction in apparent purity loss equals approximately one ton of additional sugar per 1000 tons of cane ground.

In addition to these immediately evident advantages, time lost for cleaning the mill and particularly removing leuconostock (mushroom like) infections is eliminated. Juice discoloration and off-grade sugar from excess liming before stops is eliminated, sugar loss in clarifiers during stops is greatly reduced, operation of the evaporators is improved, and scale formation in the evaporators is reduced and the scale that is formed appears to be softer than usual.

What is claimed is:

1. A method of reducing losses of sucrose in sugar juice and improving the sanitary condtion of juice extraction equipment embodying means for crushing the material from which the juice is extracted, comprising supplying about 0.5 to 10 parts by weight of a bactericidal cationic quaternary ammonium composition per million parts by weight of sugar juice extracted from the material directly to the material from which the juice is extracted in not more than the first half of the extraction equipment, the said composition comprising a solution containing 25% n-alkyl dimethyl benzyl ammonium chloride and 25% n-alkyl dimethyl ethylbenzyl ammonium chloride.

2. The method according to claim 1 wherein the quaternary ammonium composition is applied in the form of a water solution containing about 10 percent by weight of the quaternary ammonium composition.

3. A method according to claim 1 wherein additional sanitation is secured by spraying a solution of the composition at least once every 24 hours on the areas surrounding the extraction equipment that are subject to splashing with sugar juice.

4. A method according to claim 1 in which the average dosage is as specified in claim 1 and the chemical is applied by shock addition for periods of from one minute to 10 minutes at frequencies of from once every half hour to once every two hours.

5. A method according to claim 4 wherein the composition is applied for periods of 5 minutes once every half hour.

6. A method of reducing losses of sucrose in sugar juice and improving the sanitary condition in equipment for extracting juice from sugar cane having a set of crusher rolls and a plurality of sets of mill rolls which comprise discharging a bactericidal solution on the cane before it enters the crusher rolls and before it enters the first set of mill rolls but to not more than the first three-fifths of the equipment, and applying the bactericidal solution by shock addition for periods of from one minute to ten minutes at frequencies of from once every half hour to once every two hours, the bactericidal solution comprising 25% n-alkyl dimethyl benzyl ammonium chloride and 25% n-alkyl dimethyl ethylbenzyl ammonium chloride.

7. A method according to claim 1 wherein at least a substantial amount of the bactericidal composition is applied to the material before it reaches the crushing means.

References Cited

UNITED STATES PATENTS

| | | | |
|---|---|---|---|
| 2,802,757 | 8/1957 | Bacon et al. | 127—42 X |
| 2,850,410 | 9/1958 | Manly | 127—29 X |
| 2,900,283 | 8/1959 | McGahen | 127—30 |
| 2,937,958 | 5/1960 | Waterman | 127—42 |
| 3,054,678 | 9/1962 | Michener et al. | 99—150 |
| 3,427,316 | 2/1969 | Wakeman | 99—154 |
| 3,565,927 | 2/1971 | Wakeman | 99—154 |

FOREIGN PATENTS 1,019,389   10/1952   France.

OTHER REFERENCES

Chemical Abstracts, 61:9954a (1964).

Appling: "New Bactericide Inactivates Invertase" Sugar & Azucar, June 1958, pp. 23–25.

Palmer et al.: "Antibiotics for Fabrics" Soap & Chem. Specialties, 42 (4) 56–8, 83–4 (1966).

MORRIS O. WOLK, Primary Examiner

S. MARANTZ, Assistant Examiner

U.S. Cl. X.R.

21—58; 99—150, 154; 127—41; 424—339